3,468,926
3,5-DIHALO-4-CYANOALKOXY PHENOLS
Linneaus C. Dorman, Midland, Mich., assignor to The Dow Chemical Company, Midland, Mich., a corporation of Delaware
No Drawing. Filed July 8, 1966, Ser. No. 563,719
Int. Cl. C07c *121/52;* A01n *9/20*
U.S. Cl. 260—465          7 Claims

ABSTRACT OF THE DISCLOSURE 2,6-dihalohydroquinones are monoetherified to produce 3,5-dihalo-4-alkoxyphenols. The alkylating agents contain carboxyl derivatives such as the cyano and carboxamide moieties. The compounds are useful as fungicides and bactericides.

---

This invention relates to methods for mono-etherifying 2,6-dihalohydroquinones to produce 3,5-dihalo-4-alkoxyphenols wherein the alkoxy group bears as a substituent a carboxyl group or a functional derivative of a carboxyl group, such as a cyano, carbalkoxy or carboxamide group, and the products thereof. The reaction can be illustrated as follows:

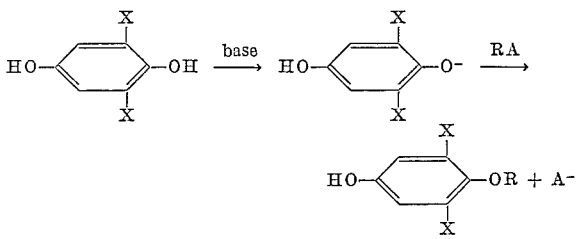

wherein X is F, Cl or Br, RA is the alkylating agent in which A is the anionic portion, such as Cl, Br, I, —OSO$_3$R, —OSO$_2$R' and the like and R is the etherifying alkyl group bearing as a substitutent a carboxyl, cyano, carbalkoxy or carboxamide group. The process of the invention is particularly advantageous where the substituent on R is hydrolyzable; i.e., the substituent is cyano, carbalkoxy or carboxamide.

Dihaloalkoxyphenols of the above formula wherein R is a methyl group have been made by reacting the hydroquinone with methyl iodide or dimethyl sulfate in an alcoholic medium. [Ungnade and Zilch, J. Org. Chem., 16, 64 (1951).]

Unsubstituted dihydroxybenzenes have been monoetherified in aqueous-organic media with simple alkylating agents such as dialkyl sulfates [Levy and Friedman, Can. Pat. 694,517, Sept. 15, 1964]. However, these prior methods give poor yields of the desired ether when alkylating 2,6-dihalohydroquinone with an alkylating agent bearing a cyano, carboxyl, carbalkoxy or carboxamide substituent.

It has now been discovered that 2,6-dihalohydroquinone can be readily mono-alkylated with an alkylating agent bearing a cyano, carboxyl, carbalkoxy or carboxamide substituent by conducting the reaction in an aprotic solvent. By "aprotic solvent" is meant those that are free of active hydrogen as determined by the Zerewitinoff reaction (with methyl magnesium iodide). This excludes water, alcohols, phenols, thiols, primary and secondary amines, carboxylic acids, and the like. Suitable solvents include dialkyl sulfoxides and sulfones, dialkylamides such as dimethylformamide, diethylformamide, N-methylpyrolidone, tetramethyl urea and the like.

With the exception of the solvent, the reaction is conducted substantially as are the conventional procedures for etherifying a phenol. Thus, the base used to ionize the phenol may be any base that is sufficiently strong to form a salt with the phenol. The most practical ones are the alkali metal hydroxides, though the alcoholates, hydrides and carbonates are suitable, as are the alkaline earth metal bases.

The alkylating agent, RA, shown in the above equation, is any conventional alkylating agent having the required substituent. Such agents are usually alkyl (including substituted alkyl) esters of strong inorganic acids; e.g. they are typically halides, sulfate or arylsulfonate esters. Typical suitable alkylating agents are the haloacetic acids, the 2- and 3-halopropionic acids and the 2-, 3- and 4-halobutyric acids wherein, in each of these acids, the halogen is chlorine, bromine or iodine; the correspondingly substituted carbonitriles; the esters of such acids, particularly the lower alkyl esters, such as the methyl, ethyl and butyl esters; the amides of such acids, such as those derived from ammonia, the lower alkyl primary and secondary amines, the cyclic amines, such as morpholine or pyrrolidine, and the like. In general, any etherifying agent that can be used to etherify a phenol by conventional procedures, such as those cited above, can be used in the present process. It is to be understood that instead of the halogenated alkylating agents set forth above, one may use, where available, the correspondingly substituted reagents in which the replaceable group is a sulfate, alkanesulfonate, arylsulfonate or other known equivalent reactive group instead of halogen.

In carrying out the process of the invention, substantially stoichiometrically equivalent amounts of dihalohydroquinone and base are used. By this is meant one equivalent of base per mole of the hydroquinone. If sufficient base is used to form the di-salt of the hydroquinone (i.e., two equivalents per mole) the final product will contain more of the etherification product of the 4-hydroxyl than of the 1-hydroxyl. Of course, the diether would result if two molar equivalents of both the base and the etherifying agent were used. So long as no excess base is present, excess etherifying agent is inert. Thus, it is possible, and sometimes desirable, to use such excess as part or all of the reaction solvent.

The reaction of the invention is operable over a wide range of temperatures, pressures, concentrations and other process variables, as is evident from the state of the art. As a practical matter, suitable temperatures are about 25–100° C., depending on the particular materials to be used. Atmospheric pressure is most convenient, though higher or lower pressures can be used if desired.

The amount of solvent to be used as the reaction medium can be varied widely. Ordinarily it is preferred to use at least enough to maintain a homogeneous liquid reaction mixture, suitable amounts being about 100–3000 ml. per gram-mole of dihalohydroquinone.

In general, a convenient technique comprises dispersing the dihalohydroquinone in the solvent, adding the base to the mixture, and then adding the etherifying agent to the alkaline reaction mixture. The etherified product is then separated from the reaction mixture by any suitable procedure, such as by extraction with an organic solvent. The latter may be the same as the reaction solvent or it may be any inert organic solvent in which the product is soluble.

The practice of the invention is illustrated by the following examples.

EXAMPLE 1

2,6-dibromo-4-hydroxyphenoxy acetonitrile

To a stirred suspension of 53.6 g. (0.200 mole) of 2,6-dibromohydroquinone, 28 g. (0.20 mole) of potassium carbonate and 300 ml. of dimethyl sulfoxide were added dropwise 16 g. (0.21 mole) of chloroacetonitrile during 15 minutes, the reaction temperature increasing from 25.5 to 28° C. during the addition. The reaction mixture was then heated at 68–73° for 7 hours and after standing overnight was diluted with 2 l. of water with stirring. A little ice was added to keep the solution temperature below 30°. Addition of a little acetic acid precipitated seed crystals (seed crystals could also be obtained by cooling and scratching). After standing 2 hours at room temperature, crystallization was completed by cooling in ice water for 1.5 hours. The solid was filtered, washed well with water, removed from the filter funnel, triturated with water in a mortar, filtered and dried. The crude product (53.6 g.) was recrystallized from 2 l. of benzene. There was obtained 29.6 g. (M.P. 163–40) of short, fiber-like crystals. Concentration of the mother liquor to 100 ml. produced a second recrystallization crop of 5.4 g. (M.P. 160.5–162.5°) for a combined yield of 57%. The analytical sample was obtained by recrystallization from benzene. M.P. 166–7°. Infrared (very dilute $CCl_4$ solution): $\nu$ (cm.$^{-1}$), 3610 (sharp, monomeric OH).

*Analysis.*—Calcd. for $C_8H_5Br_2NO_2$: C, 31.29; H, 1.64; N, 4.56; Br, 62.06. Found: C, 31.57; H, 1.83; N, 4.41; Br, 51.45.

EXAMPLE 2

The product of Example 1 was made by the following modified procedure. Purified dimethyl sulfoxide, 500 ml., was evacuated with stirring to 5 mm. pressure to remove dissolved oxygen; atmospheric pressure was restored with dry nitrogen and this cycle was repeated. A 100 ml. portion of the solvent was removed (continuous nitrogen atmosphere maintained in the system) for preparation of a solution containing 80.4 g. (0.30 mole) of 2,6-dibromohydroquinone. A mineral oil dispersion of sodium hydride, 14.2 g. (assay 52.5% or 0.31 mole of hydride), was suspended in the remaining dimethyl sulfoxide and with stirring, the 2,6-dibromohydroquinone solution was added dropwise during 0.5 hour, the reaction temperature being held below 35° with intermittent cooling. When the evolution of hydrogen was complete, 25 minutes after addition of the hydroquinone solution, 22.7 g. (0.30 mole) of chloroacetonitrile was added during 5 minutes, the reaction temperature changing from 33 to 40°. After subsiding, stirring was continued for 17 hours at room temperature then the mixture was heated at 51° for 1 hour, cooled, extracted with 75 ml. of petroleum ether (B.P. 30–60°) to remove suspended mineral oil, and the dimethyl sulfoxide layer was diluted with 4 l. of ice water and worked up as described in Example 1. There was obtained a total of 60.6 g. (66% yield) of crystallized product (two recrystallization crops, the latter recrystallized once more) of M.P. 165–166°. The yield of diether was 8.5 g. (16%), M.P. 116.5–118°.

EXAMPLE 3

2-(2,6-dibromo-4-hydroxyphenoxy)-N,N-diethylacetamide

The first part of this synthesis was conducted in a manner similar to that described in Example 2 above, using 2.35 g. (assay 52.5% or 0.051 mole of hydride) of sodium hydride-mineral oil dispersion (suspended in 125 ml. of dimethyl sulfoxide), 13.4 g. (0.050 mole) of 2,6-dibromohydroquinone (dissolved in 25 ml. of dimethyl sulfoxide) and 7.5 g. (0.050 mole) of 2-chloro-N,N-diethylacetamide. The reaction mixture was stirred at room temperature for 23 hours and then concentrated (70–80° C. at 0.5 mm. pressure) to 40–50 ml. The concentrate was taken up in 100 ml. of benzene and extracted with 100 ml. of 2 N sodium hydroxide. The benzene layer was washed with water. The combined caustic layer and washings were acidified with acetic acid and extracted several times with methylene chloride. The combined methylene chloride extracts were filtered and the solvent removed in vacuo leaving a thick dark oil (13.3 g.) as the residue. This was dissolved in 200 ml. of hot methanol, treated with activated charcoal, filtered and the warm filtrate diluted with 200 ml. of hot water. Upon slowly cooling and seeding the solution, the product crystallized as soft tan needles. Yield, 6.5 g. (34%), M.P. 150–152°. The analytical sample was prepared by recrystallization from methanol-water 50:50; short white needles, M.P. 142.8–143.8° (apparently a polymorphic form). Infrared (Nujol): $\nu$ (cm.$^{-1}$), 3170 (intermolecularly assoc. OH), 1642

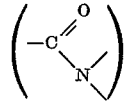

*Analysis.*—Calcd. for $C_{12}H_{15}Br_2NO_3$: C, 37.81; H, 3.97; N, 3.68; Br, 41.94. Found: C, 37.50; H, 4.11; N, 3.50; Br, 42.49.

Several attempts were made to carry out the reaction and produce the product of Examples 1 and 2 by use of methanol as the reaction solvent. In the most successful one, the desired monoether was obtained in quite crude form (M.P. 147–160°) in 9.1% yield. A yield of 7.5% of crude diether was obtained in the same experiment.

In another experiment, an attempt was made to react 2,6 - dibromohydroquinone with chloroacetonitrile and NaOH in a mixture of water and benzene as the reaction mixture, as taught in Example 1 of Can. Pat. 694,517. None of the desired monoether was obtained.

The compounds of the invention are useful as chemical intermediates. Since they are phenols, they undergo the usual reactions at the OH group. Since they have two active hydrogens in the ortho positions, they readily condense with aldehydes to make resins. Also, they can be used in the Mannich reaction wherein the phenol is condensed with formaldehyde and a secondary amine to produce aminomethyl derivatives of the phenol.

The compounds are useful as biologically active materials. Thus, for example, the product of Example 1, when applied at a concentration of $\frac{1}{2000}$ in an aqueous medium, inhibited the growth of *Staph. aureus, Aspergillus terreus, Pullularia pullulans* and *Rhizopus nigricans*. Similarly, the product of Example 3, when applied at a concentration of 50 p.p.m. in an aqueous medium killed white winter wheat, milo sorghum and Japanese millet.

I claim:
1. A compound of the formula

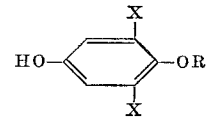

wherein each X is F, Cl or Br and R is a cyano lower alkyl group.

2. The compound of claim 1 wherein R is cyanomethyl.
3. The compound of claim 1 wherein each X is Br.
4. The process of making a compound of the formula

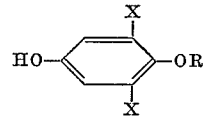

by reacting, by contacting in the presence of a stoichiometrically equivalent amount of base that forms a salt of the phenol and in an aprotic solvent, a phenol of the formula

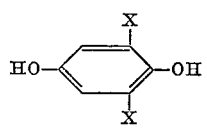

with a compound of the formula RA, where in the preceding formulas X is F, Cl or Br, R is a lower alkyl group bearing as a substituent a cyano group and A is Cl, Br, I, $-OSO_3R$ or $-OSO_2R'$ wherein R' is of the same class as R.

5. The process of claim 4 wherein each X is bromine.
6. The process of claim 4 wherein RA is a halo lower alkyl cyanide.
7. The process of claim 5 wherein RA is chloroacetonitrile.

References Cited

UNITED STATES PATENTS

| | | | |
|---|---|---|---|
| 2,819,197 | 1/1958 | Santmyer et al. | |
| 2,819,291 | 1/1958 | Heininger | 260—465 |
| 2,974,160 | 3/1961 | Heininger | 260—465 |
| 3,320,271 | 5/1967 | Lednicer. | |

OTHER REFERENCES

Bredereck et al.: Chemical Abstracts, vol. 48, p. 10, 654, 1954.

CHARLES B. PARKER, Primary Examiner

S. T. LAWRENCE III, Assistant Examiner

U.S. Cl. X.R.

71—105, 108, 116, 118; 260—52, 53, 473, 521, 559, 574, 613, 623; 424—304, 308, 317, 324